United States Patent [19]

Kawasaki et al.

[11] Patent Number: 4,966,216
[45] Date of Patent: Oct. 30, 1990

[54] HEAVY DUTY RADIAL TIRES WITH METALLIC CARCASS PLY

[75] Inventors: Kiyohito Kawasaki, Akigawa; Yujiro Umezawa, Tokyo; Toshio Sugawara, Higashiyamato, all of Japan

[73] Assignee: Bridgestone Corporation, Tokyo, Japan

[21] Appl. No.: 245,439

[22] PCT Filed: Mar. 1, 1988

[86] PCT No.: PCT/JP88/00231
§ 371 Date: Jun. 8, 1988
§ 102(e) Date: Jun. 8, 1988

[87] PCT Pub. No.: WO88/09840
PCT Pub. Date: Dec. 15, 1988

[30] Foreign Application Priority Data

Jun. 8, 1987 [JP] Japan ............................ 62-141598

[51] Int. Cl.[5] ............................................. B60C 9/16
[52] U.S. Cl. ........................... 152/556; 57/902; 152/451
[58] Field of Search ............... 152/451, 527, 548, 556; 57/204, 902

[56] References Cited

U.S. PATENT DOCUMENTS

| | | |
|---|---|---|
| 3,881,974 | 5/1975 | Zarauz . |
| 4,258,543 | 3/1981 | Canevari et al. ............. 57/902 X |
| 4,333,306 | 6/1982 | Yamashita et al. ......... 152/451 X |
| 4,399,853 | 8/1983 | Morimoto et al. ............. 57/204 X |
| 4,509,318 | 4/1985 | Yoneda ............................ 57/902 X |
| 4,586,324 | 5/1986 | Mizuma ....................... 152/451 X |
| 4,715,419 | 12/1987 | Kawasaki et al. .............. 152/527 |
| 4,718,470 | 1/1988 | Kusakabe et al. ............. 152/451 |
| 4,765,386 | 8/1988 | Ogino et al. ................... 152/556 |

FOREIGN PATENT DOCUMENTS

| | | |
|---|---|---|
| 3302673 | 8/1983 | Fed. Rep. of Germany . |
| 56-43008 | 4/1981 | Japan . |
| 2081765 | 2/1982 | United Kingdom . |

Primary Examiner—Michael W. Ball
Assistant Examiner—Geoffrey L. Knable
Attorney, Agent, or Firm—Sughrue, Mion, Zinn, Macpeak & Seas

[57] ABSTRACT

In a heavy duty radial tire, metal cords of a single layer construction obtained by twisting 3~5 metallic filaments having a filament diameter of 0.13~0.32 mm, each of which cords having an elongation $P_1$ under a load of 0.25~5 kgf/cord of 0.35~1.0% as an arithmetic mean value are arranged as a carcass ply so that a distance between cords at an end of the carcass ply is not less than 0.25 mm. Thus, it is possible to largely reduce the tire weight, avoid problems on the operability such as bead rising and the like, and considerably improve the fracture resistance, corrosion fatigue resistance and fretting resistance at carcass ply end as well as resistance to external damage in sidewall (resistance to cord breaking up) of the radial tire.

Furthermore, the above performances can be further enhanced when the tensile strength TS and filament diameter d of the metallic filament satisfy the particular relation at a load index according to ISO 4209/1 of not more than 121 or not less than 122.

4 Claims, 7 Drawing Sheets

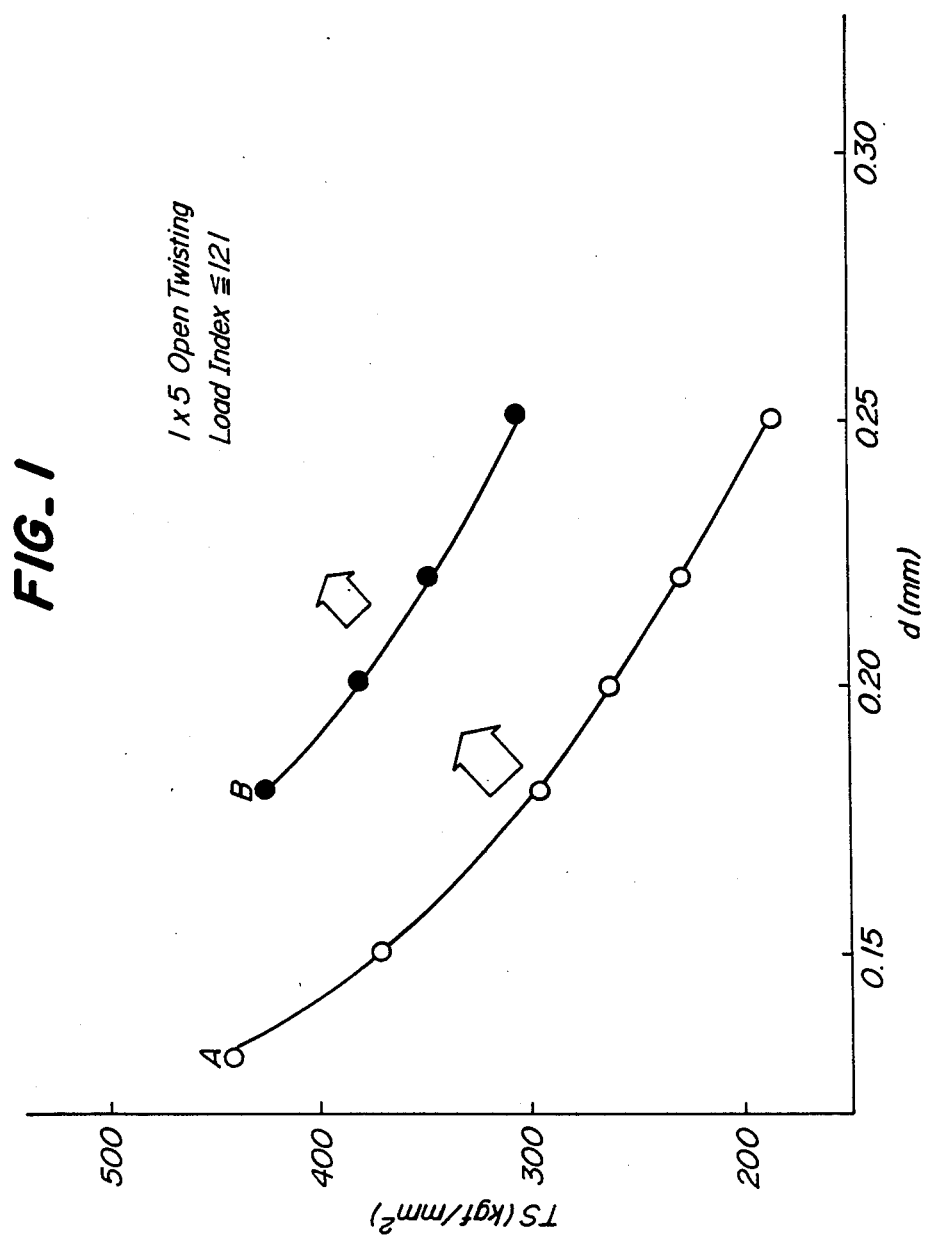

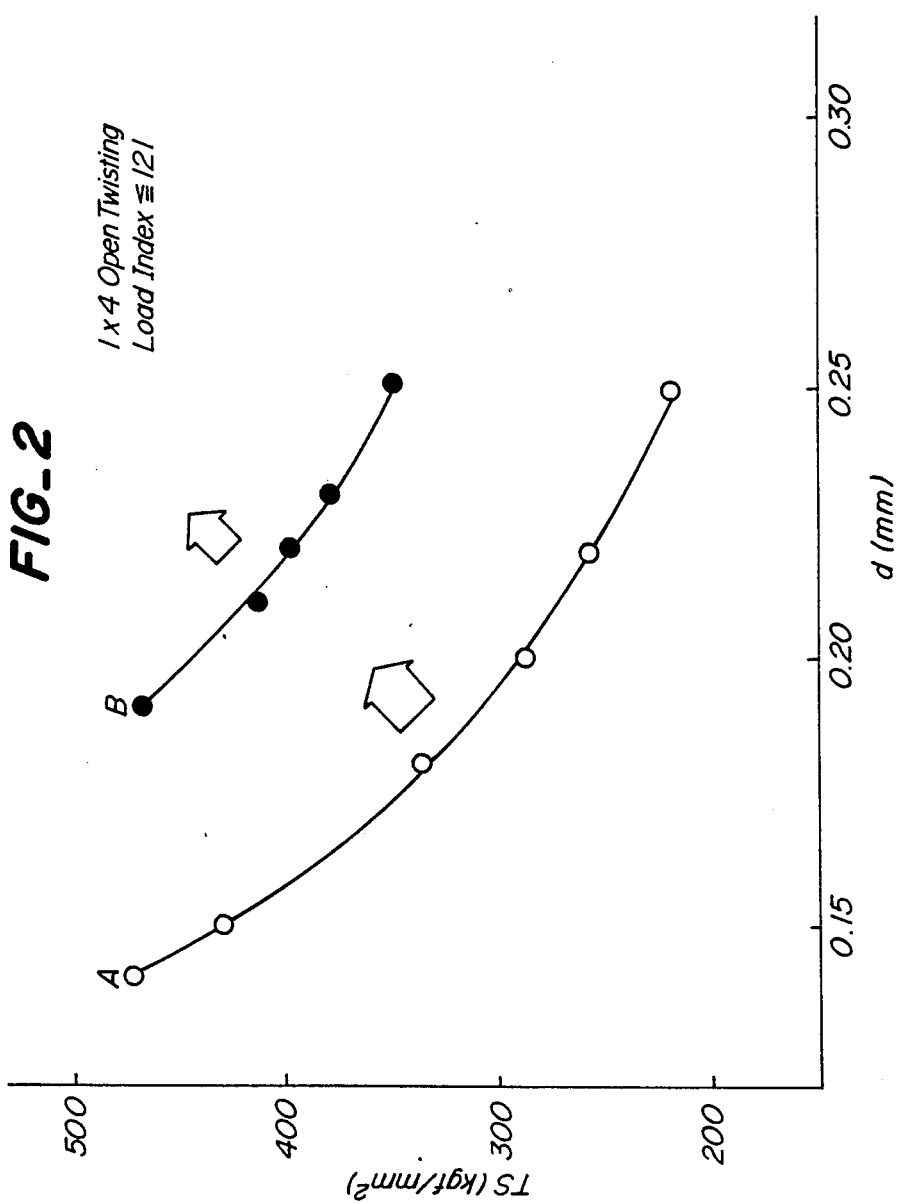

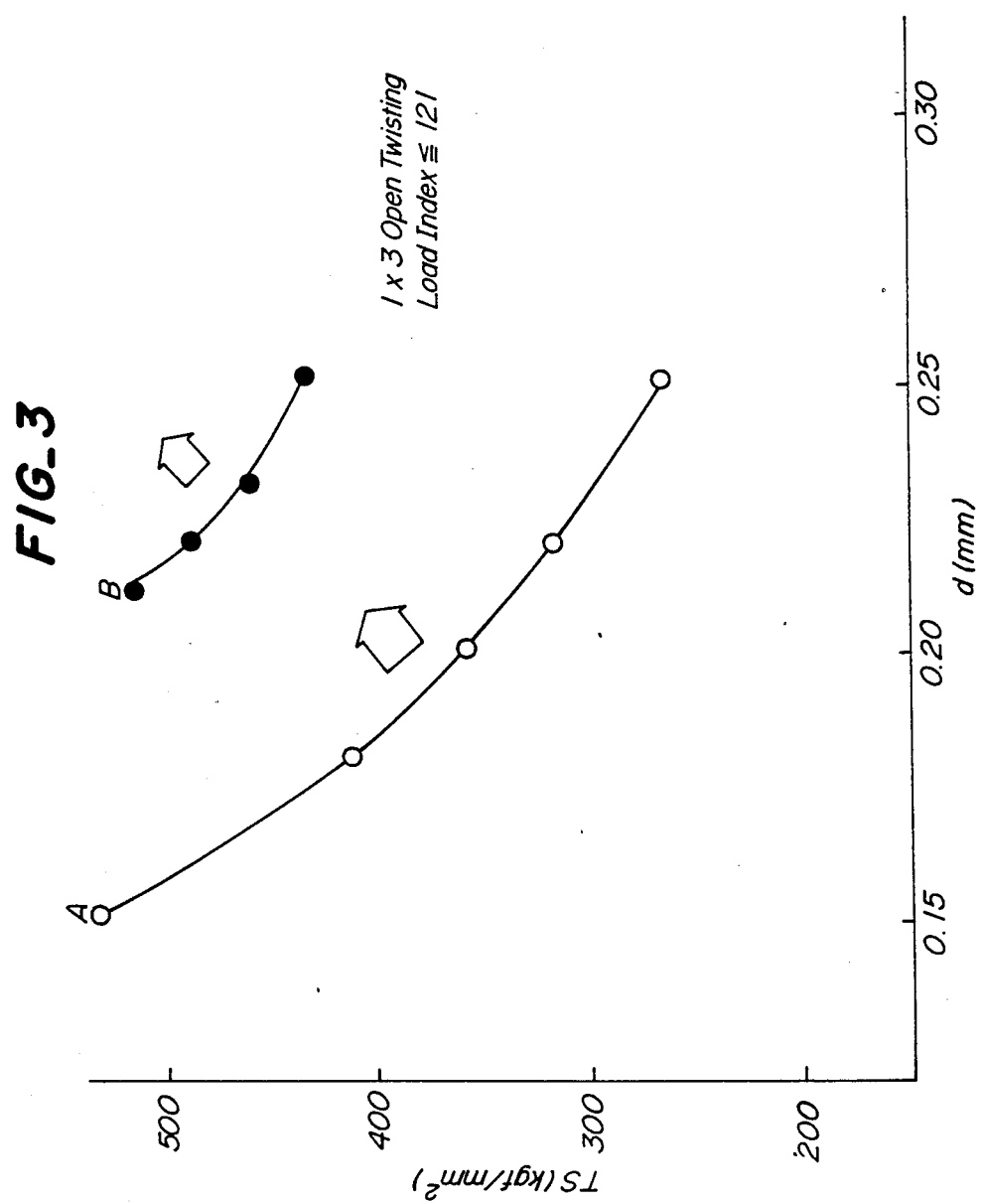

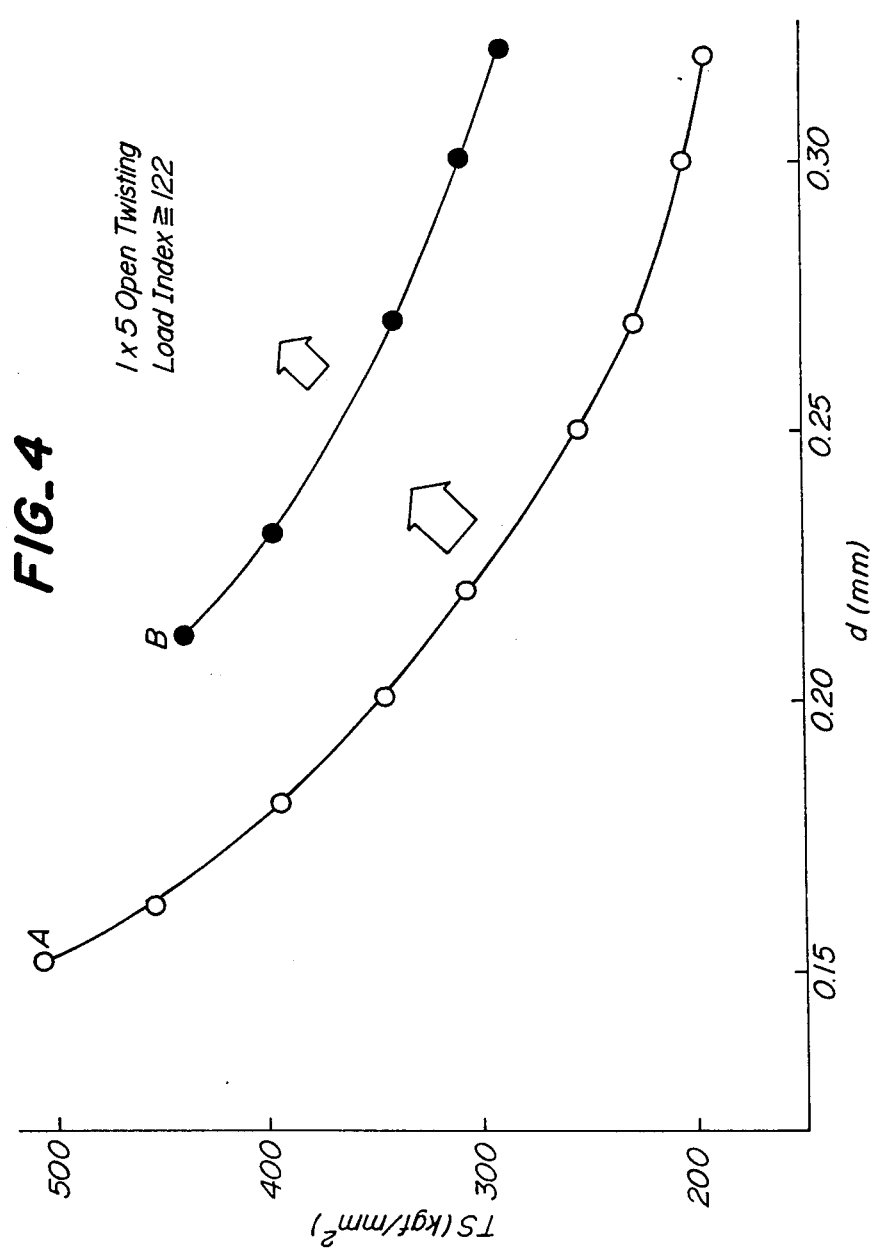

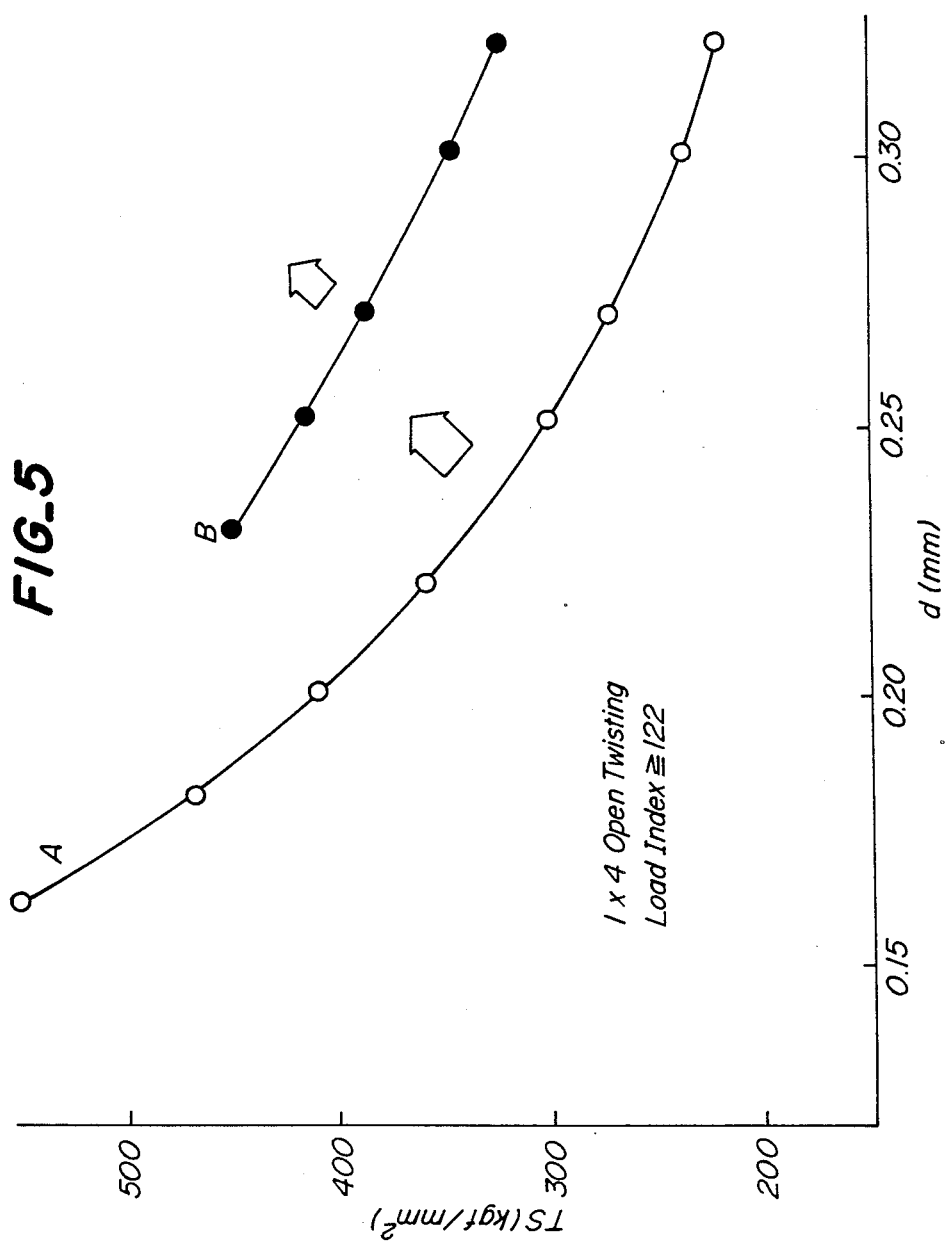

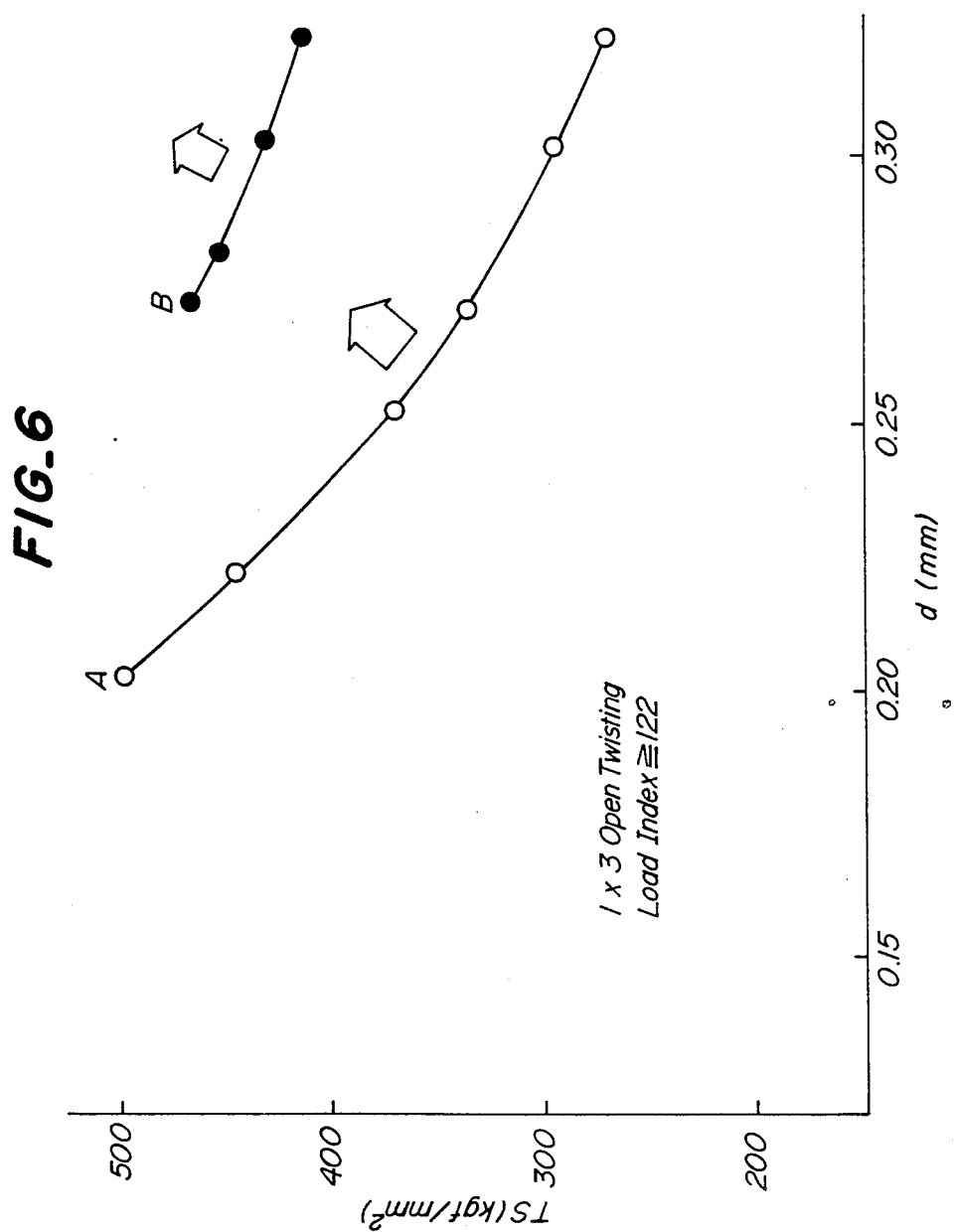

FIG_7a
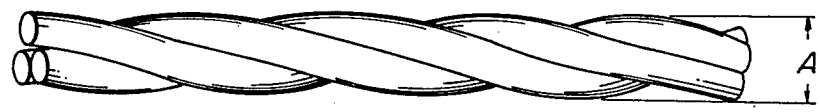
FIG_7b
FIG_9
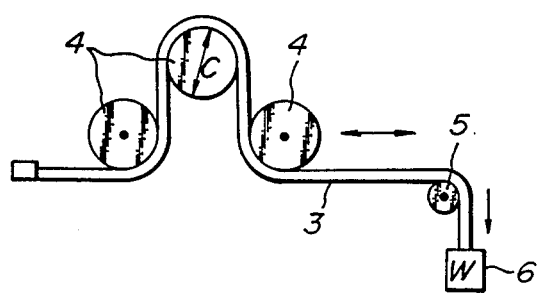
FIG_8
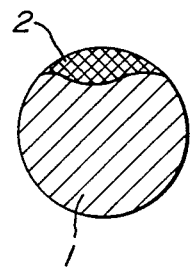

HEAVY DUTY RADIAL TIRES WITH METALLIC CARCASS PLY

TECHNICAL FIELD

This invention relates to a technique of providing heavy duty radial tires such as a radial tire for truck and bus, radial tire for light truck and the like, the durable life of which being largely prolonged by improving metallic cords applied for a carcass ply of the radial tire.

BACKGROUND ART

Recently, demands for reducing the weight of the radial tire, for prolonging the life of the tire product by reduction of rolling resistance and enhancement of retread life, and for flattening the tire shape are required even in the heavy duty radial tires in compliance with the increase of social needs such as resource-saving, energy-saving and the like. If it is intended to develop tires along such demands, when metallic cords are used as a material for carcass ply, it is an important point to solve problems on fracture resistance, corrosion fatigue resistance and fretting resistance at an end of the carcass ply.

Therefore, from a viewpoint of input to the carcass ply cord, there have been attempted the formation of steel cord with two-layer twisting construction of 3+9 (Japanese Patent laid open No. 59-124,404) and the formation of compact cord structure with a closest packing construction of 1×12 (Japanese Patent Application No. 60-35,215) and the like as a method of reducing contact pressure between cord filaments. Further there is made examination on the twisting properties of these cords in order to improve the corrosion fatigue resistance and the fretting resistance (Japanese Patent laid open No. 59-124,404).

On the other hand, a large size radial tire for use on bad roads wherein cords having a single layer construction of 1×4 or 1×5 obtained by twisting preliminarily formed filaments or a two-layer construction using 1~2 filaments as a core are used as a cord for an outermost belt layer is disclosed in Japanese Patent laid open No. 60-116,504.

The inventors have made various studies in order to develop heavy duty radial tires capable of largely improving the durable life and found that in case of the conventional 3+9 two-layer construction or 1×12 compact cord structure, the stress concentration to cord end is conspicuous in both ends of the carcass ply because rubber does not penetrate into the cord and hence fracture resistance is not sufficient at both ends of the carcass ply. Further, it has been found that it is difficult to penetrate rubber embedding the cord into the inside of the cord and a space inside the cord, i.e. a space surrounded by the filaments and opening in the axial direction of the cord is hardly clogged with the penetrating rubber so that it is impossible to move water penetrating from cut failure produced in the tread through the space formed in the inside of the cord over a far distance and the improvement of corrosion fatigue resistance is insufficient.

Moreover, as to the state of generating fretting (rubbing-out phenomenon due to the fretting of mutual filaments in the cord), the contact pressure between the filaments is high in the conventional 3+9 two-layer twisting construction or 1×12 compact cord structure, so that when the above cord construction is used as a cord for a carcass ply in radial tires for truck and bus (TBR), radial tires for light truck (LSR) or the like, fretting is caused owing to the severe input to induce the lowering of the strength and consequently the casing durability of the heavy duty radial tire is undesirably and largely degraded.

On the other hand, the technique disclosed in the above Japanese Patent laid open No. 60-116,504 is concerned with the improvement of the belt layer in the large size radial tire for use on bad road, which can not satisfy recently social demands such as a reduction of weight in the radial tire and the like. Further, when such a technique is applied to the carcass ply as it is, there are problems of bead durability and the casing strength, so that the application of this technique is impossible.

Furthermore, Japanese Patent laid open No. 57-51,502 discloses a pneumatic tire using as a reinforcement for carcass ply a steel cord of 7×4 twisting structure composed of steel filament wires constituting a greater part of the steel cord and containing 0.75~0.85% by weight of carbon and having a high tensile strength. However, this steel cord is a 7×4 strand construction, so that fretting between the strands is very large and the penetrability of rubber into the cord is poor. Consequently it does not match with the solution of the technical subject matter aiming at the invention.

It is, therefore, an object of the invention to provide an improving technique for a heavy duty radial tire which attempts a large reduction of tire weight, improves the fracture resistance, corrosion fatigue resistance and fretting resistance at the end of the carcass ply, which are problems in the above conventional technique, and can largely improve the performance of resistance to external damage in sidewall portion (resistance to cord breaking up) of the radial tire.

DISCLOSURE OF THE INVENTION

In order to achieve the above object, the invention lies in a heavy duty radial tire comprising at least one carcass ply containing cords arranged substantially at an angle of 90° with respect to the equator of the tire and wound around a bead core from inside toward outside, characterized in that as said carcass ply, metal cords of a single layer construction obtained by twisting 3~5 metallic filaments of 0.13~0.32 mm in diameter having an elongation $P_1$ under a load of 0.25~5 kgf/cord of 0.35~1.0% as an arithmetic mean value are arranged so that a distance between cords at an end portion of said carcass ply is not less than 0.25 mm.

Moreover, the single layer construction of the metal cord obtained by twisting 3~5 metallic filaments is concretely represented as 1×3, 1×4 and 1×5 below.

BRIEF DESCRIPTION OF THE DRAWINGS

FIG. 1 is a graph showing a relation between metallic filament diameter d and tensile strength TS of this filament in 1×5 open twisting structure at a load index of not less than 100 but not more than 121;

FIG. 2 is a graph showing a relation between metallic filament diameter d and tensile strength TS of this filament in 1×4 open twisting structure at a load index of not less than 100 but not more than 121;

FIG. 3 is a graph showing a relation between metallic filament diameter d and tensile strength TS of this filament in 1×3 open twisting structure at a load index of not less than 100 but not more than 121;

FIG. 4 is a graph showing a relation between metallic filament diameter d and tensile strength TS of this filament in 1×5 open twisting structure at a load index of not less than 122;

FIG. 5 is a graph showing a relation between metallic filament diameter d and tensile strength TS of this filament in 1×4 open twisting structure at a load index of not less than 122;

FIG. 6 is a graph showing a relation between metallic filament diameter d and tensile strength TS of this filament in 1×3 open twisting structure at a load index of not less than 122;

FIG. 7 is a schematic view for performing the filament forming;

FIG. 8 is a schematic view illustrating a test for the fretting resistance; and

FIG. 9 is a schematic view illustrating a test for the corrosion fatigue resistance.

BEST MODE OF CARRYING OUT THE INVENTION

The invention will be described in detail with reference to the accompanying drawings below.

In the heavy duty radial tire according to the invention, it is preferable that when a load index according to ISO 4209/1 is not less than 100 but not more than 121, tensile strength TS (kgf/mm$^2$) and filament diameter d (mm) of the metallic filament satisfy the following relations (1)~(3):

(1) when the number of metallic filaments is 5 (A in FIG. 1)

$$TS \geq \frac{37.55(2.89d + 0.25)}{\pi \times d^2}$$

(wherein d=0.13~0.25)

(2) when the number of metallic filaments is 4 (A in FIG. 2)

$$TS \geq \frac{46.94(2.61d + 0.25)}{\pi \times d^2}$$

(wherein d=0.14~0.25)

(3) when the number of metallic filaments is 3 (A in FIG. 3)

$$TS \geq \frac{62.59(2.33d + 0.25)}{\pi \times d^2}$$

(wherein d=0.15~0.25).

More preferably, in the heavy duty radial tire, when the load index is not less than 100 but not more than 121, the tensile strength TS (kgf/mm$^2$) and filament diameter d (mm) of the metallic filament satisfy the following relations (1)~(3):

(1) when the number of metallic filaments is 5 (B in FIG. 1)

$$TS \geq \frac{240.64}{\pi \times d}$$

(wherein d=0.18~0.25)

(2) when the number of metallic filaments is 4 (B in FIG. 2)

$$TS \geq \frac{271.65}{\pi \times d}$$

(wherein d=0.18~0.25)

(3) when the number of metallic filaments is 3 (B in FIG. 3)

$$TS \geq \frac{342.37}{\pi \times d}$$

(wherein d=0.21~0.25).

Furthermore, in the heavy duty radial tire according to the invention, it is preferable that when the load index is not less than 122, the tensile strength TS (kgf/mm$^2$) and filament diameter d (mm) of the metallic filament satisfy the following relations (1)~(3):

(1) when the number of metallic filaments is 5 (A in FIG. 4)

$$TS \geq \frac{52.24(2.89d + 0.25)}{\pi \times d^2}$$

(wherein d=0.15~0.32)

(2) when the number of metallic filaments is 4 (A in FIG. 5)

$$TS \geq \frac{65.31(2.61d + 0.25)}{\pi \times d^2}$$

(wherein d=0.16~0.32)

(3) when the number of metallic filaments is 3 (A in FIG. 6)

$$TS \geq \frac{87.07(2.33d + 0.25)}{\pi \times d^2}$$

(wherein d=0.17~0.32).

More preferably, in the heavy duty radial tire, when the load index is not less than 122, the tensile strength TS (kgf/mm$^2$) and filament diameter d (mm) of the metallic filament satisfy the following relations (1)~(3):

(1) when the number of metallic filaments is 5 (B in FIG. 4)

$$TS \geq \frac{286.88}{\pi \times d}$$

(wherein d=0.21~0.32)

(2) when the number of metallic filaments is 4 (B in FIG. 5)

$$TS \geq \frac{323.85}{\pi \times d}$$

(wherein d=0.23~0.32)

(3) when the number of metallic filaments is 3 (B in FIG. 6)

$$TS \geq \frac{409.57}{\pi \times d}$$

(wherein d=0.27~0.32).

On the other hand, the twisting pitch of the metal cord according to the invention is properly selected within a range of 5~20 mm.

Moreover, in the metal cord according to the invention, the metallic filaments are previously subjected to a forming treatment before the twisting into cord and further to a plastic working, which are then twisted into cord. Here, the forming ratio is represented by $B/A \times 100(\%)$, wherein A is a maximum diameter at a twisted cord state and B is a maximum amplitude of the metallic filament at a disentangled state of cord as shown in FIGS. 7(a) and (b). According to the invention, it is preferable that the forming ratio is not less than 93%. The upper limit of the forming ratio is not particularly restricted, but it is preferably up to 120% in view of production reasons.

According to the invention, in order to enhance the durability of the end portion of the carcass ply in the heavy duty radial tire, the metal cord of a so-called single open layer construction, wherein the elongation of the metal cord taken out from the tire is 0.35%~1.0% under a load of 0.25~5 kgf/cord as an arithmetic mean value, is used as a reinforcement for the carcass ply. This is based on the knowledge that the stress concentration at the end of the carcass ply can largely be mitigated by the above construction and at the same time the fracture resistance at the carcass ply end can be improved by the synergistic action with the fact that the distance between the cords at the end of the carcass ply is made to not less than 0.25 mm.

In this case, when a rubber composition having a Shore A hardness of 60~80 is used as a coating rubber for the metal cord, the durability at the carcass ply end is further improved.

According to the invention, when using the metal cord having the elongation $P_1$ of the above range, the coating rubber sufficiently penetrates into the metal cord, so that not only the corrosion of the metal cord due to penetration of water into the inside of the metal cord can be prevented, but also the mutual filaments of the metal cord are not contacted with each other. Hence the fretting resistance is considerably improved. However, when the elongation $P_1$ is less than 0.35%, it is difficult to penetrate the coating rubber into the inside of the metal cord. When it exceeds 1.0%, the tension is apt to become ununiform in the calendering operation for covering the metal cord with the coating rubber, resulting in the degradation of uniformity due to cord disturbance in the tire and the decrease of tire durability.

Furthermore, when the metal filament is 1×2 twisting, the cord strength is small and it is impossible to maintain the casing strength durable to external damage at the sidewall portion. In this case, in order to maintain the casing strength durable to the external damage at the sidewall portion, it is necessary to increase the end count larger than 1×3 twisting, 1×4 twisting and 1×5 twisting, or to make the filament diameter thick. However, the former case is difficult from a viewpoint of problem on the tire manufacturing technique, degradation of bead portion durability and the like. The latter case has problems on the bead rising phenomenon or loosening the cords from the bead due to the conspicuous increase of bending rigidity proportional to quartic of filament diameter or the degradation of corrosion fatigue resistance due to the increase of the input. On the other hand, in case of 1×6 twisting, at least one filament falls down into the inside of the cord to form substantially a two layer construction, so that there is still a problem on the difficulty for the penetration of rubber in the cord having a core as mentioned above. Therefore, in order to satisfy the required casing strength and proper productivity and ensure the corrosion fatigue resistance and fretting resistance, the single layer construction of 1×3 twisting, 1×4 twisting or 1×5 twisting should be taken and 1×4 twisting or 1×5 twisting is preferable.

The lower limit of such a filament diameter is related to the holding of the required casing strength and the degradation of durability at the carcass ply end, while the upper limit thereof is related to the bead rising accompanied with the increase of the bending rigidity and the degradation of corrosion fatigue resistance. According to the invention, they are limited to 0.13~0.25 mm in case of 1×5 twisting in the heavy duty radial tire under a load index of not less than 100 but not more than 121 as mentioned above. Preferably, it is within a range of 0.18~0.25 mm. Furthermore, in case of 1×4 twisting, it is limited to 0.14~0.25 mm and is preferably within a range of 0.19~0.25 mm. Moreover, in case of 1×3 twisting, it is limited to 0.15~0.25 mm and is preferably within a range of 0.21~0.25 mm.

Similarly, in the heavy duty radial tire under a load index of not less than 122, the filament diameter is limited to 0.15~0.32 mm and is preferably within a range of 0.21~0.32 mm in case of 1×5 twisting. Furthermore, in case of 1×4 twisting, it is limited to 0.16~0.32 mm and is preferably within a range of 0.23~0.32 mm. Moreover, in case of 1×3 twisting, it is limited to 0.17~0.32 mm and is preferably within a range of 0.27~0.32 mm.

According to the invention, when the aforementioned relation between tensile strength (TS) and filament diameter (d) is satisfied, the cord diameter of the metal cord can be restrained, so that not only the durability of the carcass ply end can be more improved but also the improvement of the casing strength can be achieved to prevent the breakage of the metal cord due to a cut of the sidewall portion.

Among metal filaments according to the invention, the metal filament having a high tensile strength can be produced by multi-stage drawing wherein the number of drawings is increased to 3~4 times with the use of a lubricant having a good durability at a reduction ratio of, for example, 97.5% as compared with the usual drawing. The carbon content of the metal filament is preferable to be 0.72~0.95%, and when it is 0.82~0.95%, the higher tensile strength is obtained. However, when it exceeds 0.95%, the metal filament undesirably becomes brittle. Moreover, the reduction ratio is favorable to be not less than 96%.

Furthermore, the metal filament according to the invention is preferable to be steel filament, which is usually used after the coating with an elementary metal of Cu, Zn, Ni or Co, or Cu-Zn alloy or the like.

The invention will be concretely described with reference to the following examples and comparative examples.

For the evaluation, tires of TBR 11R24.5 having a load index of 140 (Examples 1~7, Comparative Examples 1~10) and tires of LSR 750R16 having a load index of 108 (Examples 8~11, Comparative Examples 11~17) were used.

As to the structure of carcass ply, in case of the tire size 11R24.5, steel cords of 3+9×0.23 mm+1 were arranged at an angle of 90° with respect to the circumferential direction of the tire and at an end count density of 26 cords/50 mm in the control tire of Comparative Example 1 as shown in the following Table 1, while in the tires of Examples and the other Comparative Examples, steel cords applicable for the carcass ply shown in Table 1 were arranged at the same angle with respect to the circumferential direction as mentioned above and at an end count determined so as to match with the casing strength of the control tire of Comparative Example 1.

Furthermore, in case of tire size 750R16, steel cords of 3+9×0.19 mm+1 were arranged at an angle of 90° with respect to the circumferential direction of the tire and at an end count density of 30 cords/50 mm in the control tire of Comparative Example 11 as shown in the following Table 2. In the tires of Examples and the other Comparative Examples, steel cords applicable for the carcass ply shown in Table 2 were arranged at the same angle with respect to the circumferential direction as mentioned above and at an end count determined to match the casing strength of the control tire of Comparative Example 11.

Moreover, a rubber composition comprising 100 parts by weight of natural rubber and 50 parts by weight of carbon black HAF and having a Shore A hardness of 68 was used as a coating rubber.

The following performance evaluations were made with respect to these test tires.

Fretting resistance

A cord was drawn out from the rubberized carcass ply of the test tire extending from one bead core to the other bead core (run tire or new tire) and cut into half portions at a position corresponding to the crown center. After rubber was dissolved out in a solvent, the cut cord was disentangled into filaments. The filament strength was measured by means of a tensile tester by clamping end portions at the crown center side and the bead side of the filament with fasteners, and then the fracture surface of the filament was set in a microscope so as to see right above, whereby an enlarged photograph thereof was taken. Thereafter, the photograph was covered with a section paper to depict a circle along an edge of a non-fretted portion, from which an area S of fretted portion 2 was measured with respect to non-abrasion portion 1 causing no fretting as shown in FIG. 8. Moreover, the fretting amount was an average value obtained by dividing the measured area by a sectional area of a new steel filament per 10 cords.

The above average value was represented by an index on the basis that Comparative Example 1 in case of TBR 11R24.5 and Comparative Example 11 in case of LSR 750R16 were 100 as a control tire, respectively, wherein the smaller the fretting amount, the better the fretting resistance as shown in Tables 1 and 2.

Corrosion fatigue resistance (degradation degree)

The test method was made as shown in FIG. 9, wherein a rubberized cord 3 taken out from the tire was extended through 3 pulleys 4 of 40 mm in diameter and a fixed pulley 5 and subjected to a tensile load with a dead weight 6 corresponding to 10% of fracture load of a new cord, and then the three pulleys were repeatedly moved at a distance of 20 cm in left and right directions to apply a repetitive bending strain to the cord, whereby the cord was broken due to fatigue. The repeated number until the breakage of the cord was measured as an average rupture number per 10 cords, from which the degradation degree of corrosion fatigue resistance was determined with respect to a cord of a new tire when the new cord was 100. The corrosion fatigue resistance shown in Tables 1 and 2 was represented by an index on the basis that Comparative Example 1 in case of TBR 11R24.5 and Comparative Example 11 in case of LSR 750R16 were 100 as a control tire, respectively. The larger index value, the better the corrosion fatigue resistance.

Resistance to external damage in sidewall

A specimen having a thickness of 3 mm, a width of 50 mm and a length of 300 mm, which was obtained by embedding steel cords used in the test tire in rubber in parallel to each other in the longitudinal direction, was applied to a tension corresponding to 1/10 of steel cord strength×end count (i.e. treat strength), and a knife having a weight of 20 kg was spontaneously dropped just above in a direction perpendicular to the cord direction, whereby the resistance to external damage in sidewall was compared as a height till the cut of the cord. In Tables 1 and 2, this property was represented by an index on the basis that each control tire of Comparative Examples1 and 11 was 100. The larger the index value, the better the resistance to external damage is sidewall.

Fracture resistance at carcass ply end

The fracture resistance at the carcass ply end was evaluated at a state of causing no trouble of belt layer by buffing a tread rubber of the test tire to generate heat in the belt layer. Concretely, the test tire subjected to an internal pressure of 8.25 kg/cm² in case of 11R24.5 and 8.0 kg/cm² in case of 11R24.5 8.0 kg/cm² in case of 750R16 was rotated on a drum at a speed of 60 km/hr under a load of JIS 200%, during which a driving distance of the drum when separation failure was produced at the tip of the carcass ply cord to make vibration large was measured. The driving distance was represented by an index with respect to those of the control tires of Comparative Examples 1 and 11. The larger the index value, the better the bead durability.

Adhesion resistance (degradation degree of adhesion)

The test tire was filled with 300 cc of water and rotated on a drum under a load of JIS 200%, a speed of 60 km/hr and an internal pressure of 7.25 kg/cm² in case of 11R24.5 and 8.0 kg/cm² in case of 750R16. After running over a distance of 20,000 km, the driving of the drum was stopped and 4 cords were peeled off from the rubber at low temperature (−60° C.). Then, the amount of rubber remaining on the cord was measured at a portion of considerably lowering the rubber adhered amount by means of an image analyzer every cord. The measured value was represented by an index with respect to those of the control tires of Comparative Examples 1 and 11. The larger the index value, the better the adhesion resistance.

Confirmation of effect on tread having external damage ( A hole was pierced in a middle of the tread from the inside of the tire to cut only the cords of the carcass ply and then 300 cc of water was filled inside the tire. Thereafter, the corrosion fatigue resistance, fretting resistance and adhesion resistance were evaluated in the same manner under the same conditions as mentioned above.

Effect of reducing the weight

A ply treated composite body was prepared by embedding steel cords used in the test tire in a coating rubber for the carcass. The weight reducing effect based on the decrease of the end count when changing the end count of the test tire so as to provide the same strength as in the ply treated of the control tire of Comparative Example 1 was represented by an index as a weight of steel cords used in a single tire with respect to those of the control tires of Comparative Examples 1 and 11. The smaller the index value, the better the weight reducing effect.

Measurement of elongation $P_1$

After rubber was removed from a sample of steel cord taken out from the tire, the elongation of the steel cord sample was measured from a load-elongation curve under a load of 0.25~5 kgf/cord by means of an Instron type tensile testing machine using a length between fasteners of 200 mm, a tensile rate of 5 mm/min and a full scale of 10 kg. In this case, the elongation $P_1$ was an arithmetic mean of test results of 50 cords.

The evaluation results of performances of the aforementioned test tires are shown in Table 1 in case of TBR 11R24.5 and Table 2 in case of LSR 750R16, respectively.

TABLE 1(a)

|  | Example 1 | Example 2 | Example 3 | Example 4 | Example 5 | Example 6 |
|---|---|---|---|---|---|---|
| Twisting construction | 1 × 5 | 1 × 3 | 1 × 4 | 1 × 5 + 1 | 1 × 5 | 1 × 5 |
| Filament diameter (mm) | 0.25 | 0.28 | 0.26 | 0.25 spiral:0.15 | 0.25 | 0.18 |
| $P_1$ | 0.6 | 0.70 | 0.65 | 0.42 | 0.60 | 0.75 |
| Tensile strength (kg/mm²) | 380 | 370 | 375 | 380 | 300 | 450 |
| End count (cords/50 mm) | 40 | 50 | 47 | 40 | 46 | 56 |
| Pitch (mm) | 10 | 11 | 9.5 | 10/6 | 10 | 7.5 |
| Cord diameter (mm) | 0.72 | 0.65 | 0.68 | 0.88 | 0.72 | 0.52 |
| Cord strength (kg/cord) | 91 | 67 | 78 | 91 | 72 | 52 |
| Casing strength (kg/50 mm) | 3640 | 3350 | 3660 | 3640 | 3312 | 3136 |
| Distance between cords | 0.52 | 0.35 | 0.39 | 0.37 | 0.35 | 0.34 |
| Corrosion fatigue resistance | 300 | 285 | 295 | 170 | 330 | 300 |
| Fretting resistance | 250 | 260 | 255 | 150 | 250 | 210 |
| Adhesion resistance | 106 | 103 | 104 | 103 | 105 | 103 |
| Resistance to external damage in sidwall | 200 | 180 | 195 | 120 | 185 | 170 |
| Fracture resistance at carcass ply end | 130 | 113 | 120 | 115 | 118 | 115 |
| Tread having external damages — Corrosion fatigue resistance | 500 | 460 | 485 | 250 | 550 | 500 |
| Tread having external damages — Fretting resistance | 450 | 470 | 465 | 200 | 450 | 435 |
| Tread having external damages — Adhesion resistance | 500 | 490 | 493 | 120 | 470 | 350 |
| Effect of reducing weight | 70 | 65 | 73 | 70 | 80 | 55 |

TABLE 1(b)

|  | Example 7 | Comparative Example 1 | Comparative Example 2 | Comparative Example 3 | Comparative Example 4 |
|---|---|---|---|---|---|
| Twisting construction | 1 × 5 | 3 + 9 + 1 | 1 × 5 | 1 × 5 | 1 × 5 |
| Filament diameter (mm) | 4 filaments: 0.25  1 filament: 0.28 | 0.23 spiral:0.15 | 0.25 | 0.25 | 0.25 |
| $P_1$ | 0.55 | 0.20 | 0.30 | 0.60 | 0.6 |
| Tensile strength (kg/mm²) | 4 filaments: 380  1 filament: 370 | 290 | 380 | 240 | 250 |
| End count (cords/50 mm) | 39 | 26 | 40 | 40 | 56.7 |
| Pitch | 11 | 6/12/3.5 | 10 | 10 | 10 |
| Cord diameter (mm) | 0.75 | 0.92 (except spiral) | 0.73 | 0.73 | 0.73 |
| Cord strength (kg/cord) | 95 | 142 | 91 | 60 | 62 |
| Casing strength (kg/50 mm) | 3705 | 3692 | 3640 | 2394 | 3400 |
| Distance between cords | 0.53 | 0.85 | 0.52 | 0.52 | 0.15 |
| Corrosion fatigue resistance | 280 | 100 | 210 | 320 | 320 |
| Fretting resistance | 220 | 100 | 210 | 250 | 250 |
| Adhesion resistance | 105 | 100 | 107 | 104 | 102 |
| Resistance to external damage in sidwall | 205 | 100 | 130 | 78 | 180 |
| Fracture resistance at carcass ply end | 132 | 100 | 115 | 130 | 70 |
| Tread having external damages — Corrosion fatigue resistance | 470 | 100 | 115 | 540 | 540 |
| Tread having external damages — Fretting resistance | 460 | 100 | 170 | 450 | 450 |
| Tread having external damages — Adhesion resistance | 510 | 100 | 90 | 500 | 400 |
| Effect of reducing weight | 73 | 100 | 70 | 70 | 90 |

TABLE 1(c)

|  | Comparative Example 5 | Comparative Example 6 | Comparative Example 7 | Comparative Example 8 | Comparative Example 9 | Comparative Example 10 |
|---|---|---|---|---|---|---|
| Twisting construction | 1 × 5 | 1 × 5 | 1 × 5 | 1 × 2 | 1 × 6 | 1 × 5 |
| Filament diameter (mm) | 0.25 | 0.12 | 0.35 | 0.29 | 0.23 | 0.25 |
| $P_1$ | 1.5 | 0.65 | 0.7 | 0.40 | 0.25 | 0.25 |
| Tensile strength (kg/mm²) | 380 | 370 | 300 | 380 | 395 | 380 |
| End count (cords/50 mm) | 40 | 94 | 26 | 64 | 38 | 40 |
| Pitch | 10 | 5 | 14 | 12 | 10 | 10 |
| Cord diameter (mm) | 0.75 | 0.36 | 1.02 | 0.61 | 0.74 | 0.68 |
| Cord strength (kg/cord) | 90 | 20.5 | 141 | 49 | 97 | 91 |
| Casing strength (kg/50 mm) | 3600 | 1935 | 3700 | 3136 | 3686 | 3640 |
| Distance between cords | 0.51 | 0.17 | 0.90 | 0.17 | 0.58 | 0.57 |
| Corrosion fatigue resistance | 280 | 325 | 90 | 180 | 90 | 200 |
| Fretting resistance | 240 | 200 | 280 | 200 | 170 | 200 |
| Adhesion resistance | 90 | 102 | 104 | 102 | 105 | 100 |

TABLE 1(c)-continued

|  | Comparative Example 5 | Comparative Example 6 | Comparative Example 7 | Comparative Example 8 | Comparative Example 9 | Comparative Example 10 |
| --- | --- | --- | --- | --- | --- | --- |
| Resistance to external damage in sidwall | 210 | 100 | 205 | 195 | 110 | 140 |
| Fracture resistance at carcass ply end | 130 | 85 | 120 | 75 | 125 | 105 |
| Tread having external damages — Corrosion fatigue resistance | 450 | 530 | 150 | 270 | 110 | 100 |
| Tread having external damages — Fretting resistance | 400 | 415 | 530 | 250 | 140 | 150 |
| Tread having external damages — Adhesion resistance | 300 | 400 | 450 | 170 | 82 | 80 |
| Effect of reducing weight | 70 | 54 | 98 | 58 | 68 | 70 |

TABLE 2

|  | Comparative Example 11 | Example 8 | Example 9 | Example 10 | Example 11 | Comparative Example 12 | Comparative Example 13 |
| --- | --- | --- | --- | --- | --- | --- | --- |
| Twisting construction | 3 + 9 + 1 | 1 × 5 | 1 × 3 | 1 × 4 | 1 × 5 + 1 | 1 × 2 | 1 × 6 |
| Filament diameter (mm) | 0.19 | 0.21 | 0.25 | 0.23 | 0.21 spiral:0.15 | 0.24 | 0.20 |
|  | spiral:0.15 |  |  |  |  |  |  |
| $P_1$ | 0.18 | 0.55 | 0.62 | 0.59 | 0.40 | 0.38 | 0.24 |
| Tensile strength (kg/mm$^2$) | 290 | 380 | 410 | 390 | 380 | 400 | 390 |
| End count (cords/50 mm) | 30 | 44 | 47 | 45 | 44 | 70 | 40 |
| Pitch (mm) | 6/8/3.5 | 8.5 | 10 | 9.0 | 8.5/5 | 10 | 9 |
| Cord diameter (mm) | 0.79(except spiral | 0.61 | 0.58 | 0.60 | 0.61 | 0.51 | 0.64 |
| Cord strength (kg/cord) | 97 | 64.5 | 61.9 | 64.8 | 64.5 | 35.5 | 73.5 |
| Casing strength (kg/50 mm) | 2910(100) | 2838(97) | 2909(100) | 2916(100) | 2838(97) | 2485(85) | 2940(100) |
| Distance between cords | 0.58 | 0.49 | 0.42 | 0.40 | 0.33 | 0.20 | 0.61 |
| Corrosion fatigue resistance | 100 | 280 | 265 | 275 | 160 | 170 | 115 |
| Fretting resistance | 100 | 230 | 245 | 235 | 140 | 190 | 160 |
| Adhesion resistance | 100 | 104 | 103 | 103 | 102 | 101 | 104 |
| Resistance to external damage in sidwall | 100 | 180 | 180 | 175 | 115 | 90 | 106 |
| Fracture resistance at carcass ply end | 100 | 135 | 115 | 125 | 112 | 85 | 105 |
| Tread having external damages — Corrosion fatigue resistance | 100 | 450 | 400 | 430 | 235 | 240 | 115 |
| Tread having external damages — Fretting resistance | 100 | 410 | 430 | 420 | 180 | 205 | 145 |
| Tread having external damages — Adhesion resistance | 100 | 470 | 460 | 465 | 110 | 160 | 85 |
| Effect of reducing weight | 100 | 79 | 71 | 74 | 79 | 61 | 74 |

The followings were confirmed from the test results of Tables 1 and 2.

At first, the results will be described with respect to the tires of TBR 11R24.5

The twisting construction in Examples 1 and 5~7 is 1×5. In Example 5, however, the tensile strength is slightly displaced from the optimum range in relation to the filament diameter, so that the casing strength is somewhat lower than that of Example 1 owing to the restriction of the end count. Therefore, the resistance to external damage in the sidewall is slightly lower as compared with that of Example 1, and also the fracture resistance at carcass ply end is somewhat poor due to the increase of the end count. However, all performances in Example 5 are considerably improved as compared with those of the control tire in Comparative Example 1.

In Example 6, the filament diameter is a lower limit of the optimum range in relation to the tensile strength, so that the casing strength becomes lower due to the restriction of the end count. Therefore, the resistance to external damage in sidewall is lower as compared with that of Example 1, and also the fracture resistance at carcass ply end is somewhat poor owing to the increase of the end count. However, these performances are sufficiently good as compared with those of the control tire of Comparative Example 1, and also all of the other performances are largely improved.

Example 7 is an example of using different filament diameters, and has two different filament diameters. In this example, all performances are good as compared with those of the control tire.

Example 4 is an example of 1×5+1 construction containing a spiral filament, so that it seems that the buckling tends to be hardly caused by the wrapping of the spiral filament. However, even when the spiral filament is loosely wrapped, it is insufficient to penetrate rubber into the wrapped portion, so that the rubber penetration is poor and the durability is somewhat decreased as compared with that of Example 1, but there is no problem as compared with that of the control tire.

Examples 2 and 3 are 1×3 and 1×4 twisting constructions, respectively, so that the number of filaments is small as compared with that of Example 1. Therefore, it is required to hold the casing strength at a certain level or more in order to ensure the resistance to external damage in sidewall. Thus, in these examples, the filament diameter is made large and the end count is increased. Accordingly, the corrosion fatigue resistance and fracture resistance at carcass ply end are somewhat poor as compared with those of Example 1, but are largely improved as compared with those of the control tire.

On the other hand, Comparative Example 2 is an example when the value of $P_1$ is too small, so that the rubber penetrability is poor. Particularly, when cut damage is produced in the tread, the corrosion fatigue resistance, fretting resistance and adhesion resistance are equal to those of the control tire and the improving effect is not substantially observed. The adhesion resistance becomes rather poor.

Comparative Example 3 is an example where the tensile strength is too low, so that the casing strength is largely lowered and the resistance to external damage in sidewall is too poor. In order to ensure the fracture resistance at carcass ply end, therefore, it is necessary to increase the end count.

Comparative Example 4 is an example where the end count is increased for enhancing the resistance to external damage in sidewall, but the fracture resistance at carcass ply end is inversely and largely degraded.

Comparative Example 5 is an example where $P_1$ is too large. Therefore, the movement of filaments is violent and the adhesion resistance is poor. And also, the corrosion fatigue resistance and fretting resistance are not so improved due to the addition of a factor of end count disturbance.

Comparative Example 6 is an example where the filament diameter is too small. In this example, the casing strength is insufficient even when using the cords up to the end count limit, and the resistance to external damage in sidewall is not improved, but the fracture resistance at carcass ply end largely lowers. Furthermore, the cord bending due to the buckling is caused when the sidewall portion of the tire collides with a curbstone.

Comparative Example 7 is an example that the filament diameter is too large. In this example, the corrosion fatigue resistance is lowered as compared with that of Comparative Example 1 because the filament diameter is too large.

Comparative Examples 8 and 9 are 1×2 and 1×6 twisting constructions, respectively. In case of 1×2 construction, the number of filaments is too small, so that even if the filament diameter is made thick to an extent of not lowering the corrosion fatigue resistance, it is possible to decrease the resistance to external damage in sidewall. Therefore, when the end count is increased near to the end count limit, the distance between cords becomes narrower and the fracture resistance at carcass ply end largely lowers as compared with that of the control tire. Furthermore, the rubber penetrability is low, so that the rubber cushioning effect is less, which affects the decrease of the casing strength and also degrades the resistance to external damage in sidewall.

On the other hand, in case of 1×6 construction, the twisting construction is unstable, so that one filament falls down into the inside of the cord to degrade the rubber penetrability. Particularly, since the one of filaments entangles with the other filaments, the corrosion fatigue resistance is poor as compared with that of the control tire, and also the adhesion resistance in the cutting of the tread is poor.

Furthermore, Comparative Example 10 is an example that $P_1$ is as small as 0.25. In this example, the rubber penetrability is insufficient, and particularly the corrosion fatigue resistance and adhesion resistance are largely and undesirably lowered when the tread is subjected to external damage.

Then, the results will be described with respect to the tires of LSR 750R16.

Example 8 is an example where the twisting construction is 1×5, the filament diameter is 0.21 mm and the tensile strength is 380 kg/mm². In this example, the performances such as corrosion fatigue resistance, fretting resistance and the like are largely improved as compared with those of the control tire of Comparative Example 11.

Examples 9 and 10 are 1×3 and 1×4 twisting constructions, respectively, wherein the filament diameter is made thick or the end count is increased in order to hold the casing strength at a certain level or more. In these examples, the performances are somewhat poor as compared with those of Example 8, but are largely improved as compared with those of the control tire of Comparative Example 11.

Example 11 is a case of using a spiral filament. When the spiral filament is existent in the cord, the rubber penetrability tends to become poor, so that the durability is lowered as compared with that of Example 8, but is good as compared with that of the control tire of Comparative Example 11.

Comparative Example 12 is a case of 1×2 twisting construction. In this case, the rubber cushioning effect is less likewise the case of Comparative Example 8, and also when the end count is increased in order to maintain the casing strength, the fracture resistance at carcass ply end is degraded. Furthermore, even when taking such a means, the casing strength is still low, so that the resistance to external damage in sidewall is poor as compared with that of the control tire.

Comparative Example 13 is a case of 1×6 twisting construction. In this example, one filament falls down into the cord likewise the case of Comparative Example 9 to apparently form a two-layer construction, so that the rubber penetrability is poor. Particularly, the adhesion resistance in the cutting of the tread becomes poor.

INDUSTRIAL APPLICABILITY

As seen from the evaluation results on tire performances in Tables 1 and 2, all performances are largely improved in the test tires according to the invention. As a result, the invention can considerably improve the durable life of the heavy duty radial tire such as radial tires for truck and bus, radial tires for light truck and the like.

We claim:

1. A heavy duty radial tire comprising at least one carcass ply containing cords arranged substantially at an angle of 90° with respect to the equator of the tire and wound around a bead core from inside toward outside, characterized in that as said carcass ply, metal cords of a single layer construction obtained by twisting 3 to 5 metallic filaments each of 0.13 to 0.32 mm in diameter having an elongation $P_1$ represented by an arithmetic mean value of 0.35 to 1.0% under a load of 0.25 to 5.0 kgf/cord are arranged so that a distance between cords at an end portion of said carcass ply is not less than 0.25 mm wherein tensile strength TS (kgf/mm²) of the cords and filament diameter d (mm) of said metallic filament in the heavy duty radial having a load index according to ISO 4209/1 of not less than 100 but no more than 121 which satisfy one of the following relations (1) to (3):

(1) when the number of metallic filaments is 5, $$TS \geq \frac{37.55(2.89\,d + 0.25)}{\pi \times d^2}$$

(wherein d=0.13 to 0.25)

(2) when the number of metallic filaments is 4, $$TS \geq \frac{46.94(2.61\,d + 0.25)}{\pi \times d^2}$$

(wherein d=0.14 to 0.25)

(3) when the number of metallic filaments is 3, $$TS \geq \frac{62.59(2.33\,d + 0.25)}{\pi \times d^2}$$

(wherein d=0.15 to 0.25)

2. A heavy duty tire comprising at least one carcass ply containing cords arranged substantially at an angle of 90° with respect to the equator of the tire and wound around a bead core from inside toward outside, characterized in that as said carcass ply, metal cords of a single layer construction obtained by twisting 3 to 5 metallic filaments each of 0.13 to 0.32 mm in diameter having an elongation $P_1$ represented by an arithmetic mean value of 0.35 to 1.0% under a load of 0.25 to 5.0 kgf/cord are arranged so that a distance between cords at an end portion of said carcass ply is not less than 0.25 mm wherein tensile strength TS (kgf/mm$^2$) of the cords and filament diameter d (mm) of said metallic filament in the heavy duty radial tire having a load index according to ISO 4209/1 of not less than 100 but not more than 121 which satisfy one of the following relations (1) to (3):

(1) when the number of metallic filaments is 5, $$TS \geq \frac{240.64}{\pi \times d}$$

(wherein d=0.18 to 0.25)

(2) when the number of metallic filaments is 4, $$TS \geq \frac{271.65}{\pi \times d}$$

(wherein d=0.18 to 0.25)

(3) when the number of metallic filaments is 3, $$TS \geq \frac{342.37}{\pi \times d}$$

(wherein d=0.21 to 0.25).

3. A heavy duty radial tire comprising at least one carcass ply containing cords arranged substantially at an angle of 90° with respect to the equator of the tire and wound around a bead core from inside toward outside, characterized in that as said carcass ply, metal cords of a single layer construction obtained by twisting 3 to 5 metallic filaments each of 0.13 to 0.32 mm in diameter having an elongation $P_1$ represented by an arithmetic mean value of 0.35 to 1.0% under a load of 0.25 to 5.0 kgf/cord are arranged so that a distance between cords at an end portion of said carcass is not less than 0.25 mm wherein tensile strength TS (kgf/mm$^2$) of the cords and filament diameter d (mm) of said metallic filament in the heavy duty radial tire having a load index according to ISO 4209/1 of not less than 100 but no more than 122 which satisfy one of the following relations (1) to (3):

(1) when the number of metallic filaments is 5, $$TS \geq \frac{52.24(2.89\,d + 0.25)}{\pi \times d^2}$$

(wherein d=0.15 to 0.32)

(2) when the number of metallic filaments is 4, $$TS \geq \frac{65.31(2.61\,d + 0.25)}{\pi \times d^2}$$

(wherein d=0.16 to 0.32)

(3) when the number of metallic filaments is 3, $$TS \geq \frac{87.07(2.33\,d + 0.25)}{\pi \times d^2}$$

(wherein d=0.17 to 0,32).

4. A heavy duty radial tire comprising at least one carcass ply containing cords arranged substantially at an angle of 90° with respect to the equator of the tire and wound around a bead core from inside toward outside, characterized in that as said carcass ply, metal cords of a single layer construction obtained by twisting 3 to 5 metallic filaments each of 0.13 to 0.32 mm in diameter having an elongation $P_1$ represented by an arithmetic mean value of 0.35 to 1.0% under a load of 0.25 to 5.0 kgf/cord are arranged so that a distance between cords at an end portion of said carcass ply is not less than 0.25 mm wherein tensile strength TS (kgf/mm$^2$) of the cords and filament diameter d (mm) of said metallic filament in the heavy duty radial tire having a load index according to ISO 4209/1 of not less than 100 but not more than 122 which satisfy one of the following relations (1) to (3):

(1) when the number of metallic filaments is 5, $$TS \geq \frac{286.88}{\pi \times d}$$

(wherein d=0.21 to 0.32)

(2) when the number of metallic filaments is 4, $$TS \geq \frac{323.85}{\pi \times d}$$

(wherein d=0.23 to 0.32)

(3) when the number of metallic filaments is 3, $$TS \geq \frac{409.57}{\pi \times d}$$

(wherein d=0.27 to 0.32).

* * * * *